US008015550B2

(12) United States Patent
Berenbach et al.

(10) Patent No.: US 8,015,550 B2
(45) Date of Patent: Sep. 6, 2011

(54) SYSTEMS AND METHODS FOR HAZARDS ANALYSIS

(75) Inventors: Brian Berenbach, Edison, NJ (US); Marcus Kornek, Munich (DE)

(73) Assignee: Siemens Corporation, Iselin, NJ (US)

( * ) Notice: Subject to any disclaimer, the term of this patent is extended or adjusted under 35 U.S.C. 154(b) by 1317 days.

(21) Appl. No.: 11/563,967

(22) Filed: Nov. 28, 2006

(65) Prior Publication Data

US 2007/0150772 A1   Jun. 28, 2007

Related U.S. Application Data

(60) Provisional application No. 60/741,109, filed on Dec. 1, 2005.

(51) Int. Cl.
*G06F 9/45* (2006.01)
*G06F 11/03* (2006.01)
*G06F 3/14* (2006.01)

(52) U.S. Cl. .......... 717/124; 717/104; 717/105; 714/25; 714/30; 714/824

(58) Field of Classification Search .................. None
See application file for complete search history.

(56) References Cited

U.S. PATENT DOCUMENTS

| | | | | |
|---|---|---|---|---|
| 3,892,955 A * | 7/1975 | Maejima | | 714/736 |
| 4,870,575 A * | 9/1989 | Rutenberg | | 716/4 |
| 5,572,733 A * | 11/1996 | Ryu et al. | | 717/104 |
| 6,002,868 A * | 12/1999 | Jenkins et al. | | 717/105 |
| 6,505,342 B1 * | 1/2003 | Hartmann et al. | | 717/104 |
| 7,197,724 B2 * | 3/2007 | Wheeler et al. | | 716/4 |
| 7,404,106 B2 * | 7/2008 | Swoboda | | 714/30 |
| 7,590,973 B1 * | 9/2009 | Barry et al. | | 717/126 |
| 7,624,304 B2 * | 11/2009 | Thiagarajan et al. | | 714/25 |
| 7,716,239 B2 * | 5/2010 | Murez et al. | | 707/779 |
| 2002/0046394 A1 * | 4/2002 | Do et al. | | 717/108 |
| 2003/0135355 A1 * | 7/2003 | Wheeler et al. | | 703/14 |
| 2004/0059741 A1 * | 3/2004 | Whaling et al. | | 707/100 |
| 2004/0230944 A1 * | 11/2004 | Murphy et al. | | 717/105 |
| 2005/0021311 A1 * | 1/2005 | Deb et al. | | 702/188 |
| 2005/0034107 A1 * | 2/2005 | Kendall et al. | | 717/136 |
| 2005/0060213 A1 * | 3/2005 | Lavu et al. | | 705/7 |
| 2005/0076328 A1 * | 4/2005 | Berenbach et al. | | 717/104 |
| 2005/0138601 A1 * | 6/2005 | Simonoff et al. | | 717/105 |
| 2005/0160322 A1 * | 7/2005 | West et al. | | 714/38 |
| 2005/0256665 A1 * | 11/2005 | Hartmann et al. | | 702/121 |
| 2005/0278702 A1 * | 12/2005 | Koyfman et al. | | 717/124 |
| 2006/0005158 A1 * | 1/2006 | Pike et al. | | 717/105 |
| 2006/0020604 A1 * | 1/2006 | Murez et al. | | 707/100 |
| 2006/0059027 A1 * | 3/2006 | Berenbach et al. | | 705/7 |

(Continued)

OTHER PUBLICATIONS

"Model-Driven Safety Evaluation with State-Event-Based Component Failure Annotations"; Lars Grunske et al., 2005, pp. 1-16, <http://www.springerlink.com/content/u1cbwgc3efu9nw8y/fulltext.pdf>.*

(Continued)

*Primary Examiner* — Thuy Dao
*Assistant Examiner* — Ziaul Chowdhury

(57) ABSTRACT

A system for hazards analysis includes: a memory device for storing a program; a processor in communication with the memory device, the processor operative with the program to: access the memory device to obtain information specifying a system to be analyzed; build functional block diagrams using the information specifying the system to be analyzed; receive user-input hazards analysis elements; and use the functional block diagrams, the user-input hazards analysis elements and tree fault analysis for hazards analysis.

20 Claims, 12 Drawing Sheets

U.S. PATENT DOCUMENTS

| | | | |
|---|---|---|---|
| 2006/0122873 A1* | 6/2006 | Minotto | 705/7 |
| 2006/0150026 A1* | 7/2006 | Kolawa et al. | 714/38 |
| 2006/0253839 A1* | 11/2006 | Avritzer et al. | 717/124 |
| 2007/0038977 A1* | 2/2007 | Savage | 717/106 |
| 2007/0220342 A1* | 9/2007 | Vieira et al. | 714/33 |
| 2007/0250297 A1* | 10/2007 | Gill | 703/6 |

OTHER PUBLICATIONS

"A New Component Concept for Fault Trees", Bernhard Kaiser, 2003, pp. 37-46, <http://citeseerx.ist.psu.edu/viewdoc/download-?doi=10.1.1.92.4409&rep=rep1&type=pdf>.*

"Analysis of dependable computer systems", M. Nicholson et al., 1994, pp. 1-30, <http://citeseerx.ist.psu.edu/viewdoc/download-?doi=10.1.1.41.4075&rep=rep1&type=pdf>.*

"Human-Robot Interaction Safety problems", Ogorodnikova Olesya, 2006, pp. 1-6, <http://www.bmf.hu/conferences/raad2006/Ogorodnikova.pdf>.*

"Safety and Security in Industrial Control", Andrew J. Kornecki et al., 2010, pp. 1-4, <http://delivery.acm.org/10.1145/1860000/1852754/a77-kornecki.pdf>.*

"Failure Modelling in Software Architecture Design for Safety", Weihang Wu et al., 2005, pp. 1-7, <http://delivery.acm.org/10.1145/1090000/1083222/p5-wu.pdf>.*

"A UML Profile for Dependability Analysis of RealTime Embedded Systems", Simona Bernardi, 2007, pp. 115-124 <http://delivery.acm.org/10.1145/1220000/1217012/p115-bernardi.pdf>.*

* cited by examiner

FIG. 12

SYSTEMS AND METHODS FOR HAZARDS ANALYSIS

CROSS-REFERENCE TO RELATED PATENT APPLICATION

This application claims the benefit of U.S. Provisional Application Ser. No. 60/741,109, filed Dec. 1, 2005 and entitled "Hazards Analysis Tool," the content of which is herein incorporated by reference in its entirety.

BACKGROUND OF THE INVENTION

1. Technical Field

The present disclosure relates to data processing and, more particularly, to systems and methods for hazards analysis.

2. Discussion of Related Art

In today's expanding global market, knowledge and the ability to apply it provide an important advantage. Increasingly, product features are analyzed to determine the cost of implementation, to provide specifications for manufacturing and/or software development, and to provide a framework for developing a test plan and test cases. Use case analysis is a widely used methodology for performing product or system analysis. Use case analysis is a means of modeling the requirements of the product or system to be built.

The use case provides one or more scenarios describing a set of possible sequences of interactions between systems and users called actors performing tasks in a particular environment and related to a specific goal or function. Use case actors may be end users or other systems. The relationships among the use cases and the actors are often diagrammed using the Unified Modeling Language.

The Unified Modeling Language (UML) is a general-purpose modeling a language for specifying, visualizing, constructing, and documenting the artifacts of a system-intensive process. It can be used for business process modeling, systems engineering modeling, representing organizational structures, as well as software development. UML includes a standardized graphical notation used to create an abstract model of a system, referred to as a UML model. UML models may be serialized in XML Metadata Interchange (XMI). The XMI format is a standard for exchanging metadata information via XML (extensible markup language) between modeling tools based on the UML.

Products and services are regularly required to have an associated hazards analysis for regulatory purposes. Where there is a use case or UML model, it is helpful that the hazards analysis be integrated into the modeling framework. However, a hazards analysis facility should remain sufficiently independent of a modeling environment such that documentation can be done even if there is no associated UML model.

A hazard may result in finding additional system or product requirements to mitigate the hazard. These requirements must be documented. For example, the hazard should trace to the use case (scenario) with which it is associated. That is, the requirements derived from a study of the hazard should trace back to the hazard. In addition, the requirements derived from the hazard must trace to/from other requirements that are impacted or that impact on the hazard-related requirement.

Conventional hazard analysis techniques that focus on discrete failure events consider faults likely to lead to failures based on physical effects. In these event-based techniques, hazard analysis consists of identifying the failure events that can lead the system to a hazardous state. These failure events are usually organized into causal chains or trees. Examples of event-based hazard analysis techniques include Fault Tree Analysis (FTA) and Failure Modes and Effects Criticality Analysis (FMECA).

Many systems evolve to accomplish changing objectives or to adapt to environmental pressures or changing customer tastes. A primary design goal may be to ensure that the safety constraints continue to be enforced as changes occur throughout the life of the system. Accidents in complex systems, for example, often involve the migration of the system toward an unsafe or unstable state. Since traditional hazard analysis techniques view systems as static, hazards resulting from a migration of the system to an unsafe state can be overlooked. Traditional hazard analysis techniques may do a poor job of handling complex human decision making, organizational and managerial aspects of systems, and the adaptation of systems over time.

SUMMARY OF THE INVENTION

According to an exemplary embodiment of the present invention, a system for implementing hazards analysis comprises: a memory device for storing a program; a processor in communication with the memory device, the processor operative with the program to: access the memory device to obtain information specifying a system to be analyzed; build functional block diagrams using the information specifying the system to be analyzed; receive user-input hazards analysis elements; and use the functional block diagrams, the user-input hazards analysis elements and tree fault analysis for hazards analysis.

According to an exemplary embodiment of the present invention, a system for providing a graphical user interface for implementing hazards analysis comprises: a memory device for storing a program; a processor in communication with the memory device, the processor operative with the program to generate a graphical user interface (GUI), wherein the GUI includes: a first viewer for graphically displaying hazards analysis elements and relationships therebetween; a first graphical editor for building functional block diagrams using the interface components; and a second graphical editor for tree fault analysis.

According to an exemplary embodiment of the present invention, a computer-implemented method is provided for hazards analysis. The computer-implemented method includes: displaying menus enabling user selection of a plurality of hazards analysis elements; receiving a plurality of hazards analysis elements and properties of the hazards analysis elements; displaying the hazards analysis elements and relationships therebetween; building functional block diagrams using a system specification, the hazards analysis elements and the properties of the hazards analysis elements; and using the functional block diagrams and tree fault analysis to determine causes of the hazards elements.

BRIEF DESCRIPTION OF THE DRAWINGS

The present invention will become more apparent to those of ordinary skill in the art when descriptions of exemplary embodiments thereof are read with reference to the accompanying drawings.

FIG. 12 illustrates a spreadsheet with hazard analysis information, according to an exemplary embodiment of the present invention.

DESCRIPTION OF EXEMPLARY EMBODIMENTS

Hereinafter, exemplary embodiments of the present invention will be described in detail with reference to the accompanying drawings. In hazards analysis, a hazard is broadly comprised of three components: a hazardous element, an initiating mechanism, and a target/threat. The hazardous element is the basic hazardous resource creating the impulse for the hazard. The initiating mechanism is the trigger or the initiating event that causes an occurrence of the hazard. The target/threat is a person or item that would be exposed to injury or damage in the event of an occurrence of the hazard.

Figure 1:
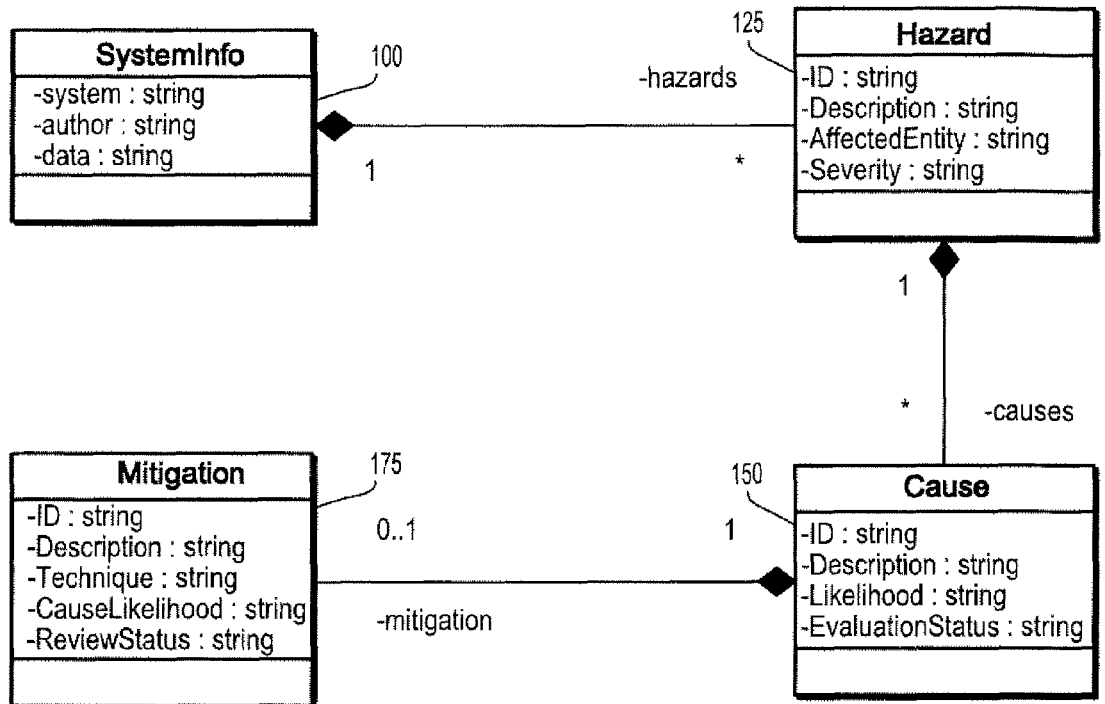
FIG. 1 shows the class diagram of a data model, according to an exemplary embodiment of the present invention.

A data structure for implementing hazard analysis, according to an exemplary embodiment of the present invention, includes four elements: SystemInfo, Hazard, Cause and Mitigation. FIG. 1 shows the class diagram of a data model, according to an exemplary embodiment of the present invention. Referring to FIG. 1, a SystemInfo 100 contains one or multiple Hazards 125. Each of the Hazards 125 includes at least one Cause 150. Mitigation 175 is associated to a Cause 150. A Cause 150 does not necessarily contain Mitigation 175. For example, a Cause 150 may not contain Mitigation 175 when the risk of the cause is sufficiently low or when the estimated costs of the mitigation are unacceptably high.

Figure 2:
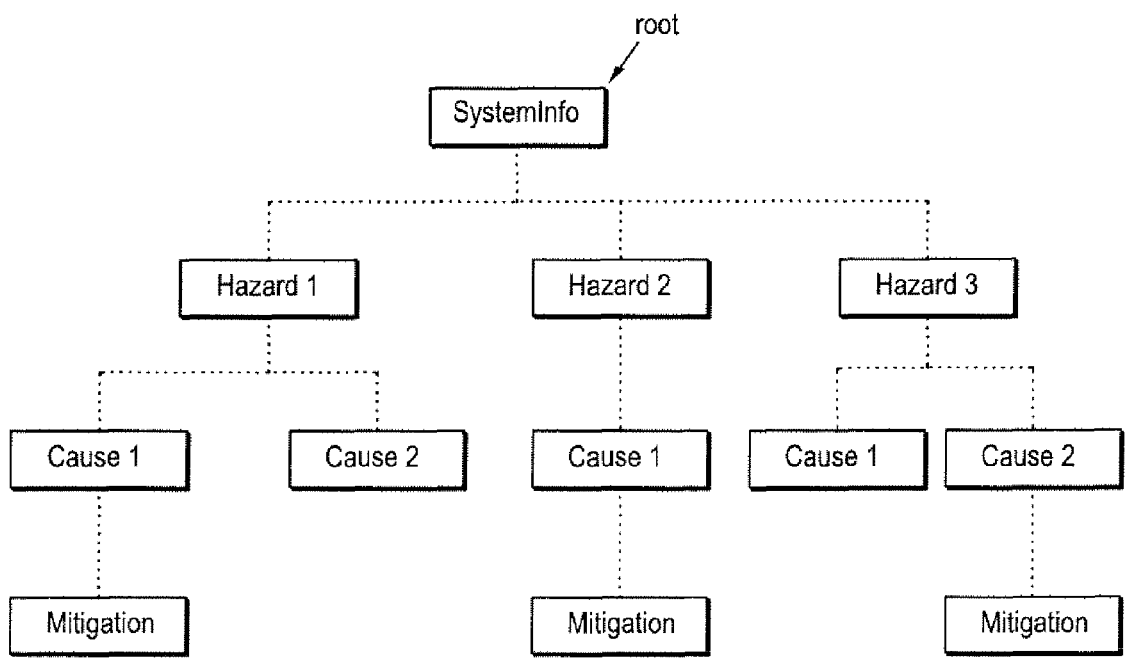
FIG. 2 shows a hierarchical data model where data is organized in a tree-like structure, according to an exemplary embodiment of the present invention.

In an exemplary embodiment of the present invention, a hierarchical data model is adopted where data is organized in a tree-like structure. FIG. 2 shows a data model where data is organized in a tree-like structure, according to an exemplary embodiment of the present invention. Referring to FIG. 2, the data model is organized in a tree where the SystemInfo 100 is the root. As shown in FIG. 2, hazard 2 contains only one cause, whereas hazard 1 and hazard 3 each contain two causes. Hazard 1 contains cause 1 and cause 2, with respect to which cause 1 contains mitigation but cause 2 does not.

Hereinafter, graphical user interfaces and input dialog boxes for entry of hazards, causes and mitigation information, according to exemplary embodiments of the present invention, will be described with reference to FIGS. 3 through 8.

Figure 3:
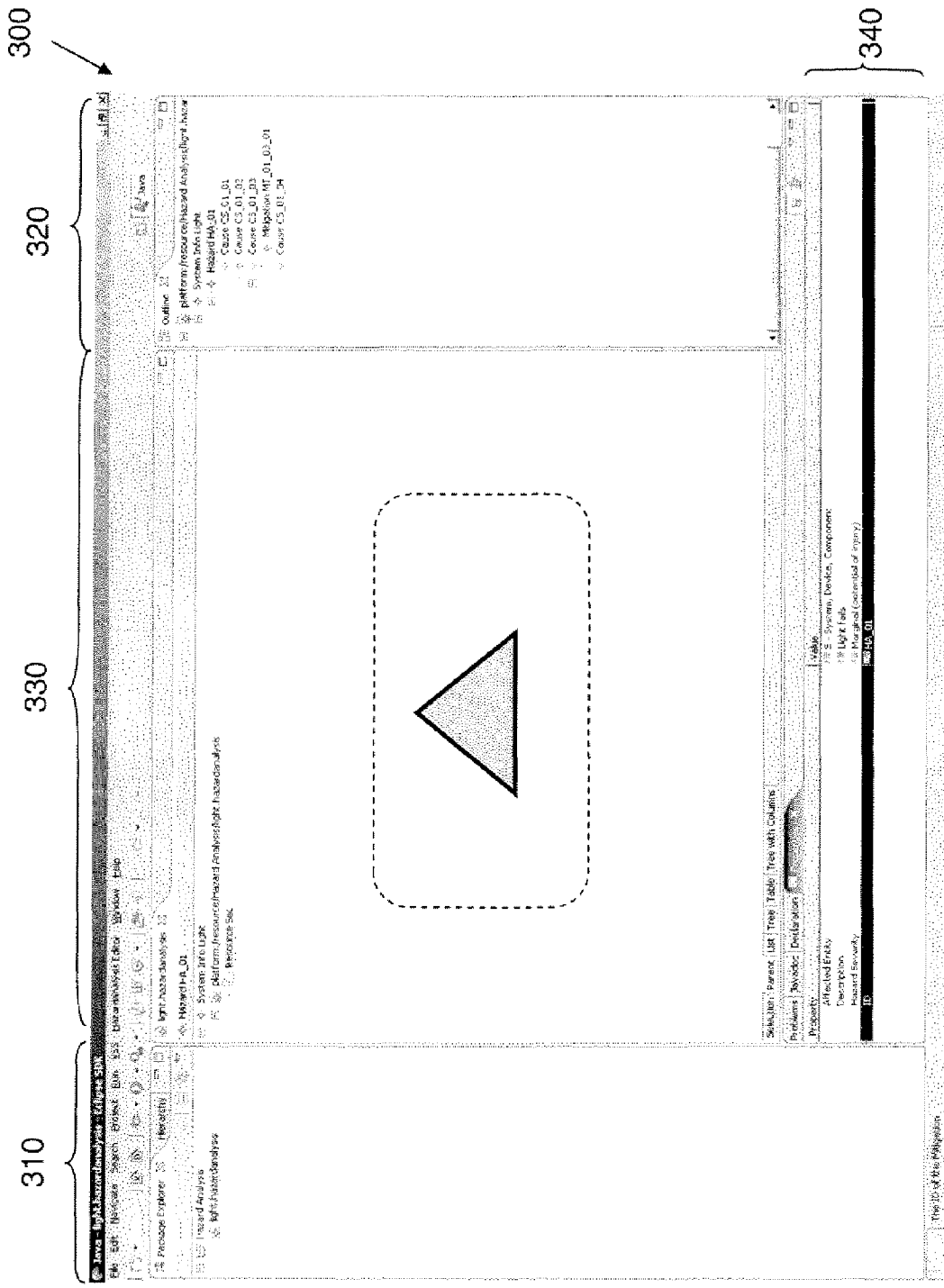
FIG. 3 illustrates a graphical user interface for entering hazards, causes and mitigation information, according to an exemplary embodiment of the present invention.

FIG. 3 illustrates a graphical user interface for entering hazards, causes and mitigation information, according to an exemplary embodiment of the present invention. Referring to FIG. 3, the graphical user interface (GUI) 300 is organized into three windows arranged in columns and a fourth window extending horizontally and arranged below two of the three column-like windows.

The left window of graphical user interface (GUI) 300 includes a tabbed package editor panel 310. This panel contains an expanding/collapsing tree view of hazard packages, which permits the selection of a hazard for viewing, along with all its associated diagrams and elements.

The central window of the GUI 300 includes a tabbed hazards analysis guide panel 330. The hazards analysis guide provides an introduction to hazard analysis, such as examples or tutorials, frequently-asked questions, etc. There may be guidance to help the user to identify all the possible hazards in the system to be analyzed. For example, the hazards analysis guide panel 330 may contain a preliminary hazards list, which is a list of possible hazards that can occur. Using the preliminary hazards list the user can consider in which part of the system the hazard can occur, e.g., software, hardware, user-system interaction.

The dialog may contain the definition of each of the three hazards analysis elements and/or examples. There may be guidance for uncovering the causes, such as one or more questions to help lead the user to a different view of the problem, e.g., "What is immediate, necessary and sufficient to cause the hazard?"

The right window includes a tabbed outline panel 320. The outline panel 320 of the GUI 300 shows the details of a single hazard, including different scenarios associated with the hazard, shown in an expandable/collapsible tree view.

A fourth window, which is shown arranged below the hazards analysis guide panel 330 and the outline panel 320 of the GUI 300, includes a tabbed properties panel 340.

Figure 4:
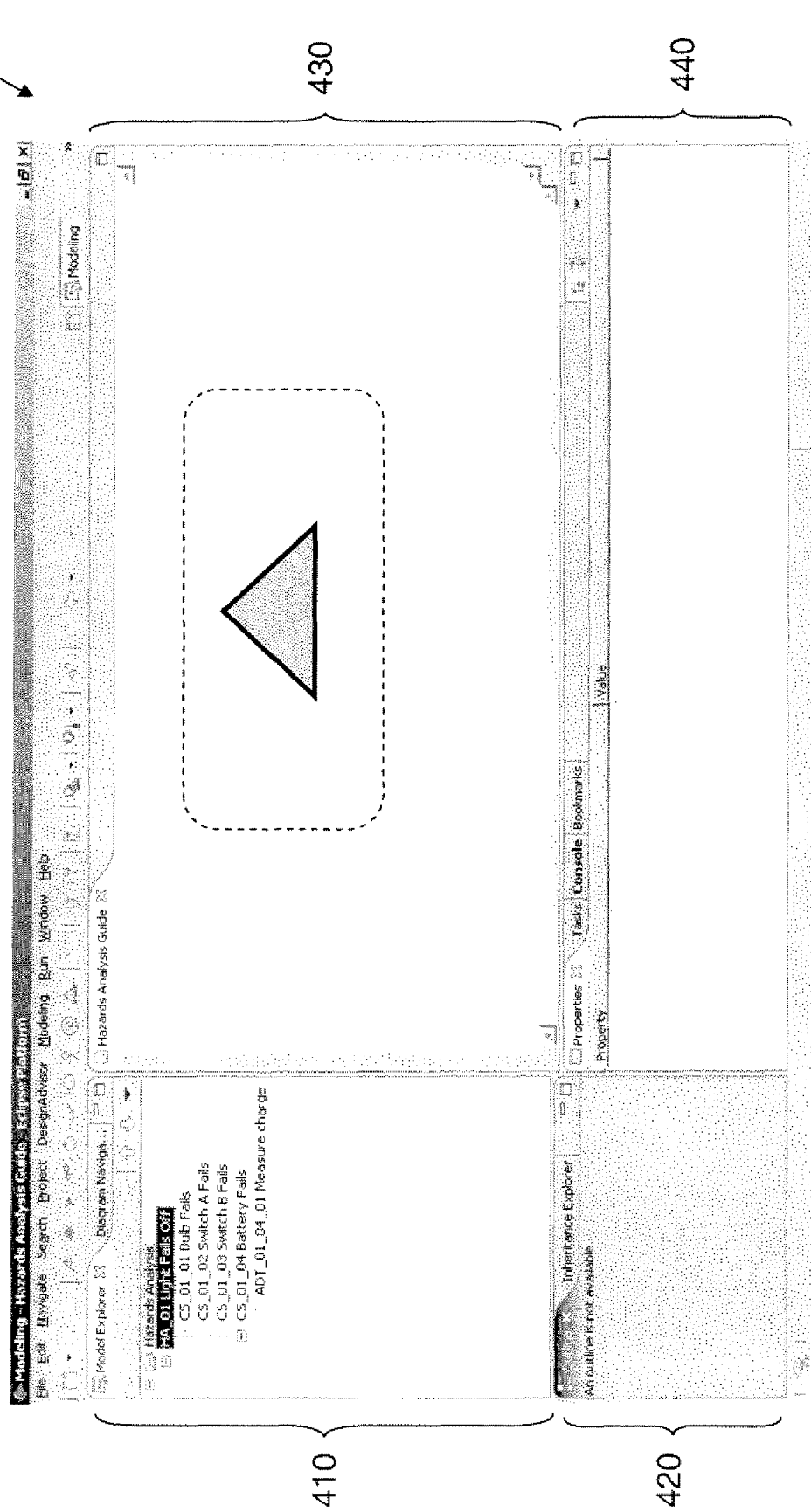
FIG. 4 illustrates a graphical user interface for entering hazards, causes and mitigation information, according to an exemplary embodiment of the present invention.

FIG. 4 illustrates a graphical user interface for entering hazards, causes and mitigation information, according to an exemplary embodiment of the present invention. Referring to FIG. 4, the graphical user interface (GUI) 400 is organized into four regions or quadrants. The upper-left quadrant includes a tabbed model explorer panel 410. The model explorer panel 410 may display a hazard analysis perspective using a tree viewer, which shows the relationships between hazards, causes and mitigations.

The lower-left quadrant of the GUI 400 includes a tabbed outline panel 420. The outline panel 420 may be used as a preview for a graphical diagram.

The upper-right quadrant includes a tabbed hazards analysis guide panel 430. This panel may provide the same guidance as the hazards analysis guide panel 330 of the GUI 300 described in connection with FIG. 3.

The lower-right quadrant of the GUI 400 includes a tabbed properties panel 440. In the properties panel 440, details are provided on the selected element of the tree viewer in the model explorer panel 410. For example, the information displayed in the properties panel 440 may be divided into columns including, for example, the headers "property" and "value" shown in FIG. 4.

When viewing a diagram, elements on the diagram may be selected using a pointing device such as a mouse. Each element can have default and/or user-defined properties, such as for example, date created, date modified or author. When the element is selected, the default and user defined properties for that element will be visible, and the property name and value will be displayed in the properties window.

The hazards-cause-mitigation tree view shows the hazards, their causes and the mitigations for the respective causes. The hazards-cause-mitigation tree provides a description of each element, with its unique identifier. The elements of the tree are objects from the underlying data structure, any change (delete or add) to them will result in a change of the data structure.

The description table view shows more detailed information for the selected element listed in the hazards-cause-mitigation view. The displayed information may not be modifiable within the cell of the properties view.

Input dialog boxes may be provided to allow a user to input information regarding hazards, causes and mitigations. Menus such as dropdown menus associated with the dialog boxes may be changed by user input to adapt to a particular domain. Information entered into the dialog boxes may be displayed by the hazard-cause-mitigation tree and/or the properties panel 440 shown in FIG. 4.

Figure 5:
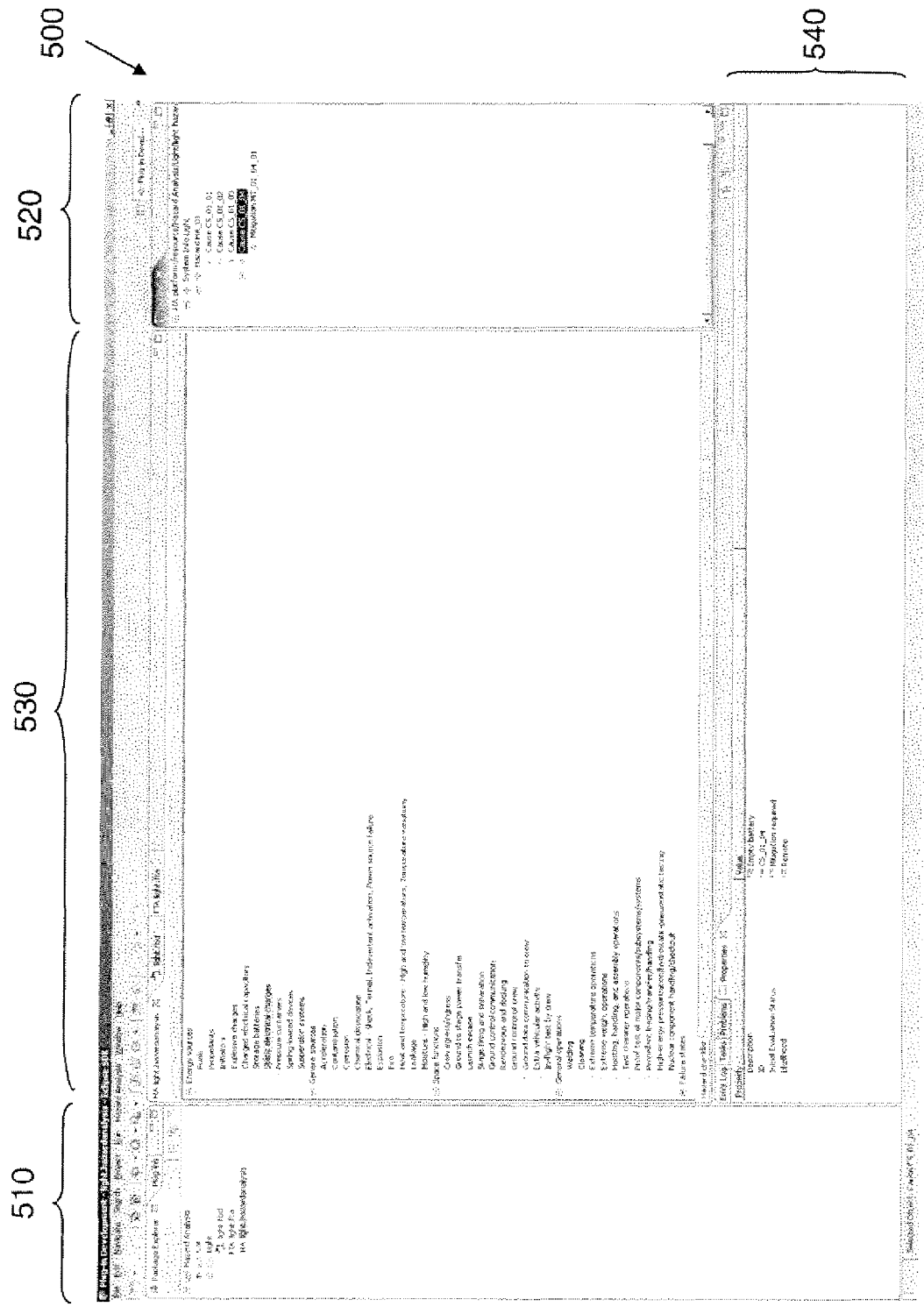
FIG. 5 illustrates a graphical user interface for entering hazards, causes and mitigation information, according to an exemplary embodiment of the present invention.

FIG. 5 illustrates a graphical user interface for entering hazards, causes and mitigation information, according to an exemplary embodiment of the present invention. Referring to FIG. 5, the graphical user interface (GUI) 500 is organized into four panels, utilizing the same basic layout as the graphical user interface (GUI) 300 described in connection with FIG. 3.

The left window of graphical user interface (GUI) 500 includes a tabbed package explorer panel 510. The package explorer panel 510 panel of FIG. 5 displays an expanding/collapsing tree view of a hazard project package. A hazard project package, which may be started by the file wizard of eclipse, shows all the files related to the analysis packages, which permits the selection of a hazard analysis file which contains the hazard-cause-mitigation tree for viewing, along with all its associated diagrams and elements.

Hazards analysis guide panel 530 may include a descriptions of hazards analysis elements and/or a preliminary hazard list. The preliminary hazard list can be used as a starting point for hazard analysis. With the help of this list the engineer can identify hazards.

Panel 520 shows an example of a hazard-cause-mitigation tree. The descriptions of the elements are added and the tree is built in this panel. Panel 540 can be used to list detailed a description of an element in the tree from panel 520, depending on which element is selected.

Figure 6:
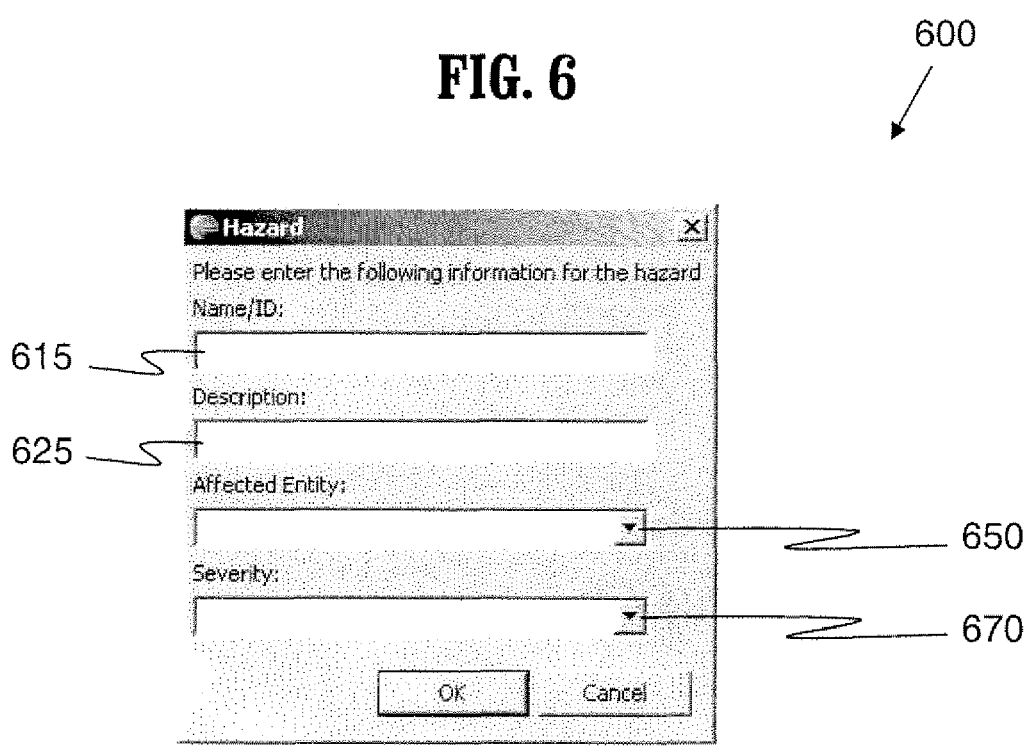
FIG. 6 shows an input dialog box that allows the user to input hazard information, according to an exemplary embodiment of the present invention.

FIG. 6 shows an input dialog box that allows the user to input hazard information, according to an exemplary embodiment of the present invention. The user can add hazards to a system for providing hazard analysis by bringing up this dialog box. Referring to FIG. 6, the dialog box 600 includes the title "Hazard" in the windows title bar. The dialog box 600 is herein referred to as the Hazard dialog box 600. The Hazard dialog box 600 includes fields for name/ID, description, affected entity and severity. The Name/ID field 615 allows the user to enter an identifier for the hazard. For example, the hazard identifier may be a character string, such as a unique numeric character string, a unique alpha-numeric character string, such as for example, "HA_01", shown in FIGS. 3, 4 and 5, or a unique non-numeric character string.

The Description field 625 allows the user to enter a description of the hazard, such as for example, "Light fails off" as shown in FIGS. 3 and 4.

Affected entity information may include patient, user/other person, service personnel, system, device, components, area around device or environment. For example, when the user selects the downward arrow on the right-hand corner of the Affected Entity field 650, it may be possible to select one of the following: P—Patient; A—User/Other Person; T—Service Personnel; S—System, Device, Components; or U—Area around device, environment.

Severity information may be classified as: negligible, such as where there is little or no potential for injury; marginal, such as where there is a potential for injury; critical, such as where there is potential for death or serious injury; or catastrophic, such as where there is potential for multiple deaths or serious injuries. In an exemplary embodiment of the present invention, when the user selects the downward arrow on the right-hand corner of the Severity field 670, it is possible to select one of the following: Negligible, Marginal, Critical or Catastrophic. It is to be understood that the Severity field 670 may be embodied with various severity classifications.

As shown in FIG. 6, the Hazard dialog box 600 includes a command button row at the bottom of the dialog box, which is comprised of an "OK" button and a "Cancel" button. When users click the OK button, the data is saved and dialog box may be closed. When users click the Cancel button in the dialog box, the window is closed and the settings in the dialog box are restored to the state they were in when the dialog box was opened. The Hazard dialog box 600 may include other buttons, such as for example, "Help", "Reset" and/or "Close" buttons (not shown), which may be included in the command button row.

After hazards have been added, the user can begin to specify the hazards by entering the causes for each of the respective hazards. For example, the user may bring up an input dialog box and enter information into a set of fields.

Figure 7:
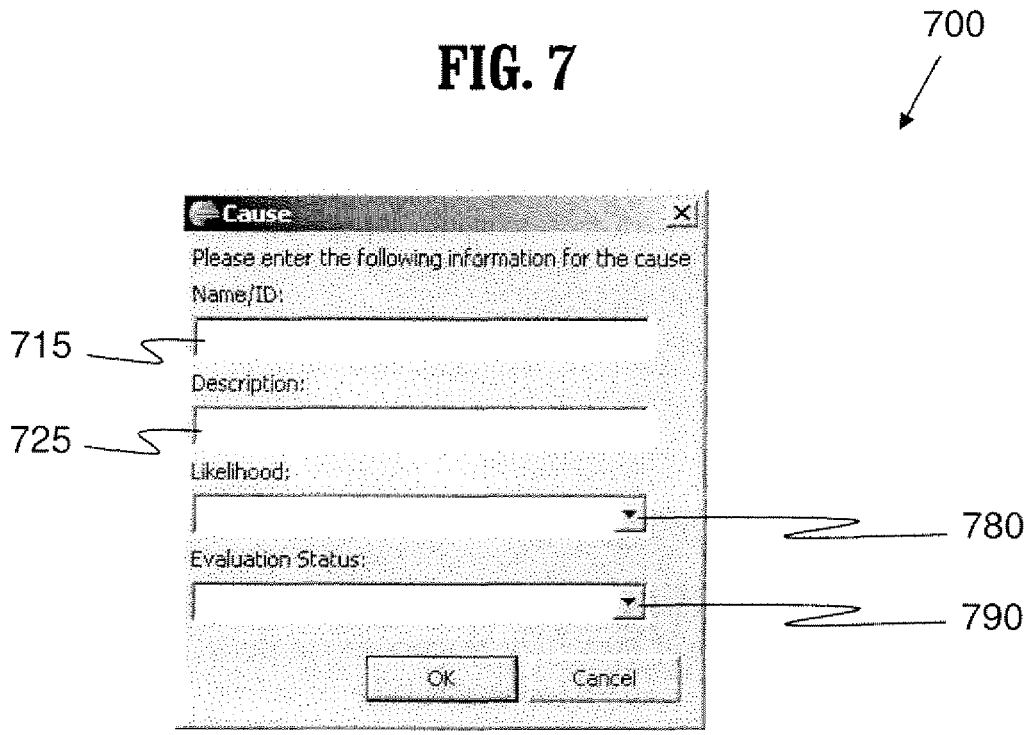
FIG. 7 shows an input dialog box that allows the user to input cause information, according to an exemplary embodiment of the present invention.

FIG. 7 shows an input dialog box that allows the user to input cause information, according to an exemplary embodiment of the present invention. The user can add causes to a system for providing hazard analysis by bringing up this dialog box. Referring to FIG. 7, the dialog box 700 includes the title "Cause" in the windows title bar. The dialog box 700 is herein referred to as the Cause dialog box 700. The Cause dialog box 700 includes fields for name/ID, description, likelihood, and evaluation status. The Name/ID field 715 allows entry of an identifier for the cause.

The cause identifier may be a character string, such as a unique numeric character string, a unique alpha-numeric character string, such as for example, "Cause_01_01", shown in FIGS. 3, 4 and 5, or a unique non-numeric character string.

The Description field 725 allows the user to enter description of the cause. Examples of cause descriptions include "empty battery," "failing switches," etc.

Likelihood information may be classified as: incredible, e.g., 0-1% probability of occurrence; improbable, e.g., 1-5% probability of occurrence; remote, e.g., 5-10% probability of occurrence; occasional, e.g., 10-30% probability of occurrence; probable, e.g., 30-60% probability of occurrence; and frequent, e.g., 60-100% probability of occurrence. In an exemplary embodiment of the present invention, when the user selects the downward arrow on the right-hand corner of the Likelihood field 680, it is possible to select one of the following: Incredible, Improbable, Remote, Occasional, Probable, or Frequent. It is to be understood that the Likelihood field 780 may be embodied with various likelihood classifications.

Evaluation status information may be classified as: mitigation required, such as when the hazard severity and the cause likelihood indicate that there is a risk; or acceptable, such as when the hazard severity and the cause likelihood indicate that there is insufficient or no risk. When the user selects the downward arrow on the right-hand corner of the Evaluation Status field 780, it may be possible to select either Mitigation Required or Acceptable.

As shown in FIG. 7, the Cause dialog box 700 includes a command button row at the bottom of the dialog box, which is comprised of an "OK" button and a "Cancel" button. The Cause dialog box 700 may include other buttons, such as for example, "Help", "Reset" and/or "Close" buttons (not shown), which may be included in the command button row.

In a case where hazards analysis reveals a need to mitigate the causes of the hazard, the user can enter a mitigation strategy. For example, the user may bring up an input dialog box and enter information into a set of fields to identify and/or provide a description of the mitigation and/or select one of a class of mitigation techniques to be applied.

Figure 8:
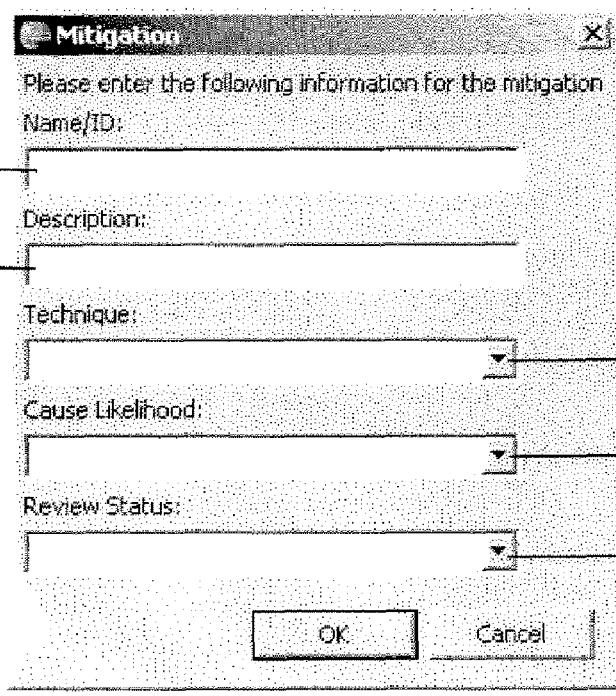
FIG. 8 shows an input dialog box that allows the user to input mitigation information, according to an exemplary embodiment of the present invention.

FIG. 8 shows an input dialog box that allows the user to input mitigation information, according to an exemplary embodiment of the present invention.

The user can add mitigation information to a system for providing hazard analysis by bringing up this dialog box. Referring to FIG. 8, the dialog box 800 includes the title "Mitigation" in the windows title bar. The dialog box 800 is herein referred to as the Mitigation dialog box 800. The Mitigation dialog box 800 includes fields for name/ID, description, technique, CS likelihood, and review status. The Name/ID field 815 allows entry of an identifier for the mitigation. The mitigation identifier may be, for example, a character string, such as a unique numeric character string, a unique alpha-numeric character string or a unique non-numeric character string.

The Description field 825 allows the user to enter detailed description of the mitigation. For example, in the case when the cause is "empty battery," a possible mitigation description is: add volt meter to light system in order to monitor electricity.

The Mitigation dialog box 800 allows the user to specify a mitigation technique. For example, the user may be presented with a list of classes of mitigation techniques from which to select. In an exemplary embodiment of the present invention, when the user selects the downward arrow on the right-hand corner of the Technique field 830, it is possible to select one of the following: Design or Redesign, Protective Measures, or Warnings.

Design or Redesign technique, or add Protective Measures or Warnings, Cause likelihood information may be classified as: incredible, e.g., 0-1% probability of occurrence; improbable, e.g., 1-5% probability of occurrence; remote, e.g., 5-10% probability of occurrence; occasional, e.g., 10-30% probability of occurrence; probable, e.g., 30-60% probability of occurrence; and frequent, e.g., 60-100% probability. In an exemplary embodiment of the present invention, when the user selects the downward arrow on the right-hand corner of the Cause Likelihood field 840, it is possible to select one of the following: Incredible, Improbable, Remote, Occasional, Probable or Frequent. The Cause Likelihood field 840 may be embodied with various likelihood classifications.

Review status information may be classified as: acceptable, such as when the risk after mitigation is acceptable; or unacceptable, such as when the risk after mitigation is unacceptable. When the user selects the downward arrow on the right-hand corner of the Review Status field 850, it is possible to select one of the following: Acceptable or Unacceptable.

To start a new hazard analysis, it is necessary to open a new hazard analysis file. The capability may be provided for the user to open the file wizard of the eclipse framework. For example, use "ctrl+n" to bring up the wizard; select Hazard Analysis; click "continue" and enter system information for the system being analyzed; and click "finish" and the hazard analysis perspective will be opened.

In a case where the user is using the panel 520 of the GUI 500 of FIG. 5 to build the hazards-cause-mitigation tree, the context menu of the eclipse framework may be used. For example, to add a new hazards analysis element, the user selects an element in the tree, brings up the context menu and selects "New Child" (dialog box opens with blank fields), enters information and saves the data entered.

Modifying a hazards analysis element may include: selecting a hazards analysis element to modify; double clicking on the selected element (dialog box opens with the existing information); changing information; and saving the changes.

A graphical user interface for use in a system for providing hazard analysis, according to an exemplary embodiment of the present invention, includes editors for functional block diagrams and for fault tree analysis.

Figure 9:
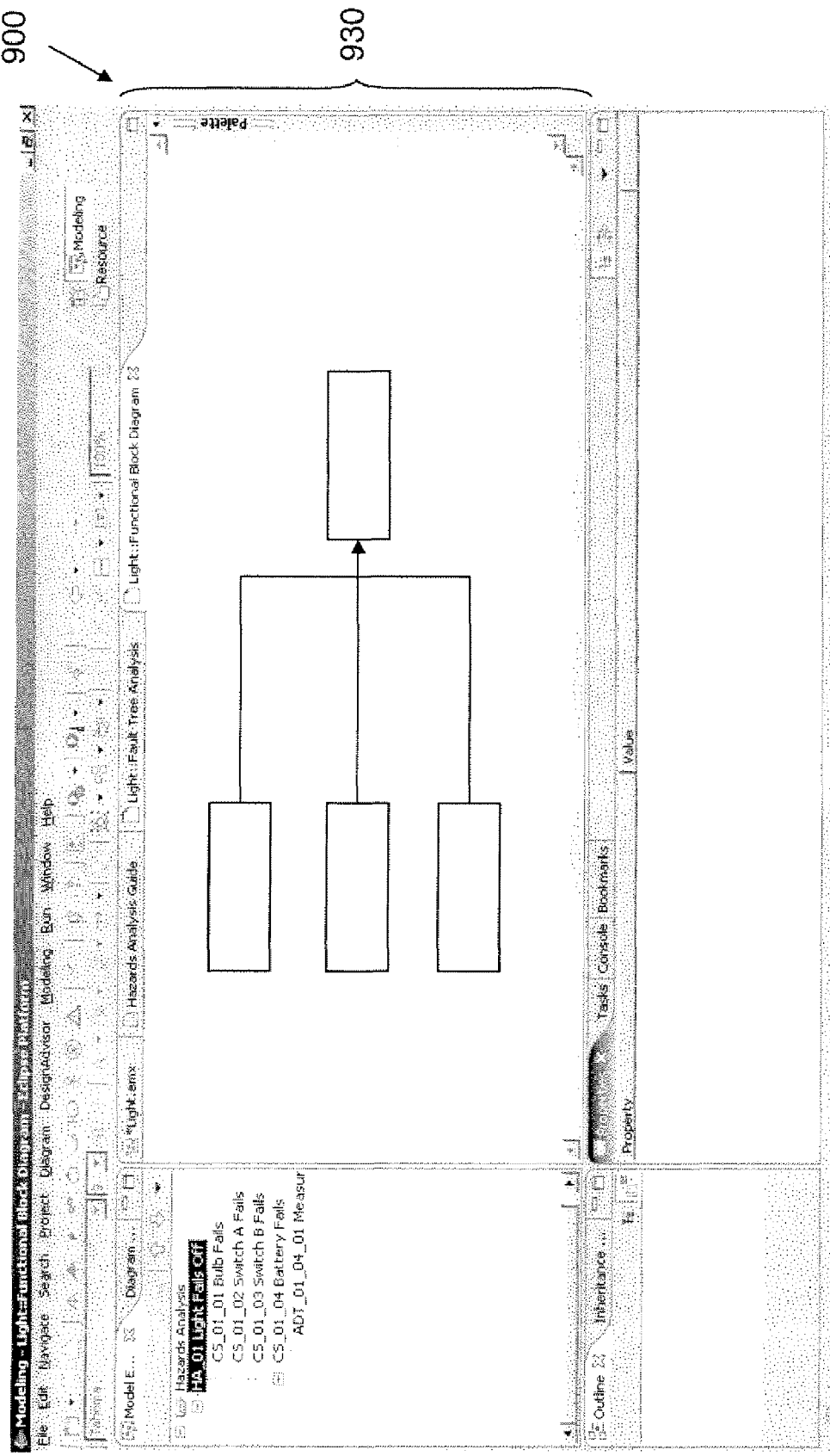
FIG. 9 illustrates a graphical user interface with a functional block diagram view, according to an exemplary embodiment of the present invention.

FIG. 9 illustrates a graphical user interface with a functional block diagram view, according to an exemplary embodiment of the present invention. The functional block diagram view shown in the graphical user interface (GUI) 900 depicts a functional block diagram representation of a system to be analyzed, that is, a system on which hazard analysis is to be performed. Each of the boxes represents an item of the system which is connected to other items by arrows to show their dependencies. According to an exemplary embodiment of the present invention, a functional block diagram provides a simplified representation of the system to be analyzed and allows the user to identify the causes of hazards, and forms the levels and events directly for the fault tree analysis. The panel 930 of the GUI 900 shows a functional block diagram of a simple system comprised of a "Battery", "Switch A" and "Switch B", each of which are connected to a "Light".

In an exemplary embodiment of the present invention, functionalities of standard hazard analysis are extended by a functional block diagram editor and the fault tree analysis. The fault tree analysis (FTA) is used for reliability, maintainability and safety analysis. The FTA can be used to uncover the causes of the hazards in a systematical way and can calculate possibilities for the occurrence of the hazard. For example, the FTA may be used to evaluate the probability of a hazards event using analytical or statistical methods.

Figure 10:
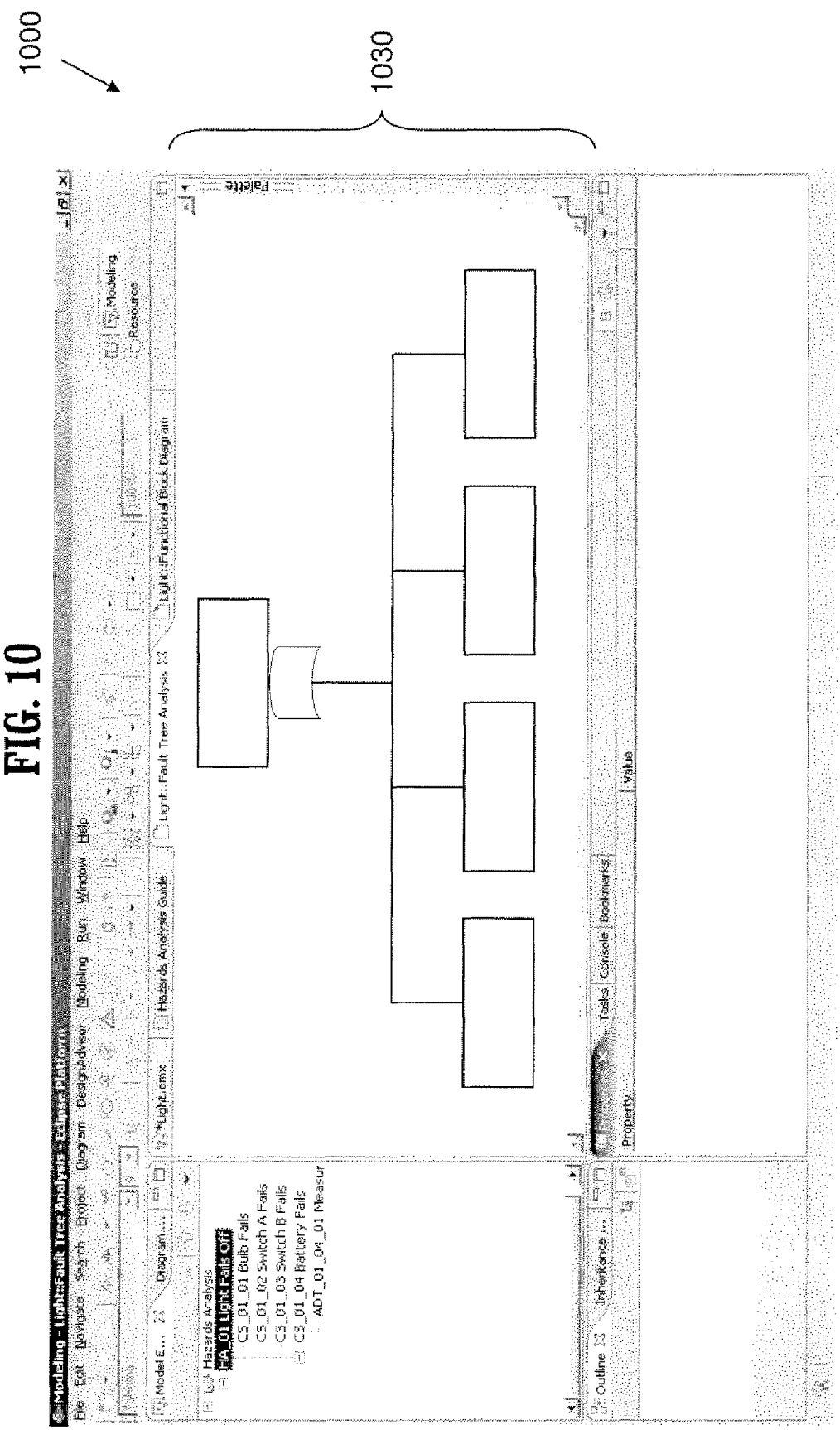
FIG. 10 illustrates a graphical user interface with a fault tree view, according to an exemplary embodiment of the present invention.

FIG. 10 illustrates a graphical user interface with a fault tree view, according to an exemplary embodiment of the present invention. The fault tree view depicts the fault tree during/after the FTA. The fault tree is a hierarchical structure containing the causes that are necessary for the hazard to occur. The fault tree can have multiple levels, wherein each of the levels represents a certain level of detail. At each progressively lower level in the fault tree, for example, the higher the degree of detail. The leaves of the fault tree represent the root causes, which may cause in the hazard. In an exemplary embodiment of the present invention, the root causes can be transferred to the hazards-cause-mitigation tree.

Referring to FIG. 10, the system that is under investigation is a light system. The fault tree displays the causes for the light system, where each leaf of the tree provides a single cause. These causes are: "Bulb fails", "Switch A fails", "Switch B fails", and "Battery fails". They are the root causes of the hazard and are connected by a logical OR. When these causes are identified by the FTA they may be mapped to the hazard-cause-mitigation tree, for example, in panel 410 of FIG. 4.

To draw a new functional block diagram, it is necessary to open a new functional block diagram file. For example, the user may take the following steps: Open the file wizard of the eclipse framework, for example, using "ctrl+n". Select Hazard Analysis, Functional Block Diagram File (the Functional Block Diagram editor will be opened). Drag and drop system components onto the editor and give them a name. Connect the components.

To draw a new fault tree, it is necessary to open a new fault tree file. For example, the user may take the following steps: Open the file wizard of the eclipse framework, for example, using "ctrl+n". Select Hazard Analysis, Fault Tree File (the Fault Tree editor will be opened). The top level event is the hazard. Each new level is formed by causes for the hazard. These causes may be dragged from the palette and connected by logical gates from the palette. Bottom level causes, such as leafs in the case of the fault tree, form the causes for the tree viewer, which have special items on the palette that can be dragged into the drawing space.

When fault tree finished, the user may click on a synchronize button (not shown) to transfer causes to the tree viewer. For example, clicking the synchronize button takes the leaves that are the causes for the hazard and transfers them to the hazards-cause-mitigation tree view, for example, in panel 520 of FIG. 5.

In an exemplary embodiment of the present invention, an UML use case diagram editor is provided. The hazards symbol of the use case diagram is directly connected to the hazard analysis. For example, the plug-in may be configured to operate with Rational Software Modeler (RSM), and the use case editor of RSM can be used.

The UML Use Case View contains the system use case and the hazards which are covered by the hazards analysis. Since the diagram will also contain requirements (functional/non-functional) the traceability from hazard to requirement is simplified.

An UML Use Case editor, according to an exemplary embodiment of the present invention, will be extended by a graphical representation of a hazard. UML Use Case. For example, with this editor, it will be possible to add hazards to the use case diagrams of the modeled systems. With this it will become evident where in the system a hazard can occur and what use of the system may cause hazardous behavior. It is also possible to trace from the hazard to the requirements so that the engineer can see quickly whether he or she has to adjust the requirements.

To draw a new use case diagram, it is necessary to open a new UML model file. For example, the user may take the following steps: Open the file wizard of the eclipse framework, for example, using "ctrl+n". Select Modeling, UML Model to open the UML Model editor. Build a use case diagram using the palette. Add hazard symbol from the top. Bring up context menu for hazard symbol. Select "connect to hazard analysis" to open dialog with a list of hazards from which to select. The user may add a new hazard. If a new hazard is added the tree viewer will be extended by the new hazard.

The information gained from the hazards analysis needs to be readable and understandable. In an exemplary embodiment of the present invention, a reporting capability is provided that produces quality documentation using a spreadsheet software. For each description field of a hazards analysis element there will be one column in the spreadsheet.

Figure 11:
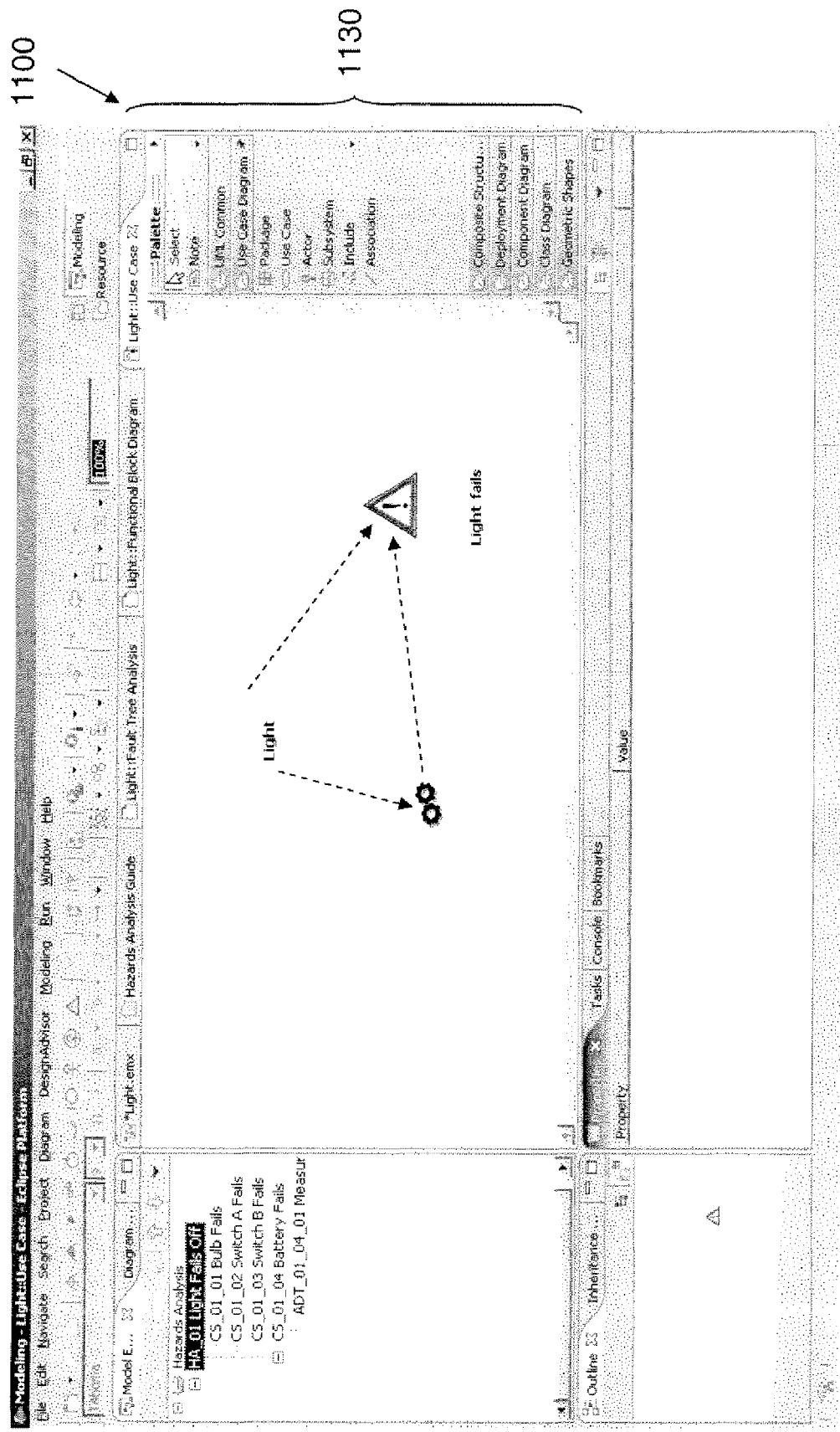
FIG. 11 illustrates the synchronization of a UML use case symbol with a hazard, according to an exemplary embodiment of the present invention.

FIG. 11 illustrates the synchronization of a UML use case symbol with a hazard, according to an exemplary embodiment of the present invention. When modeling, hazard symbols are connected to use cases with an association, e.g., "may cause". When the hazard is selected, a hyperlink may be used to activate a system employing a graphical user interface (GUI) for hazards analysis according to an exemplary embodiment of the present invention, and the specific hazard information may be displayed in the GUI.

For example, in panel 1130 of the GUI 1100, the use case symbol represents the light system in the example described above in connection with FIG. 10. In this example in which the hazard is a failing light, the use case symbol is associated to the hazard symbol. The hazard symbol is an extension to the UML use case diagrams and is linked to the graphical user interface (GUI) for hazards analysis according to an exemplary embodiment of the present invention.

Figure 12:
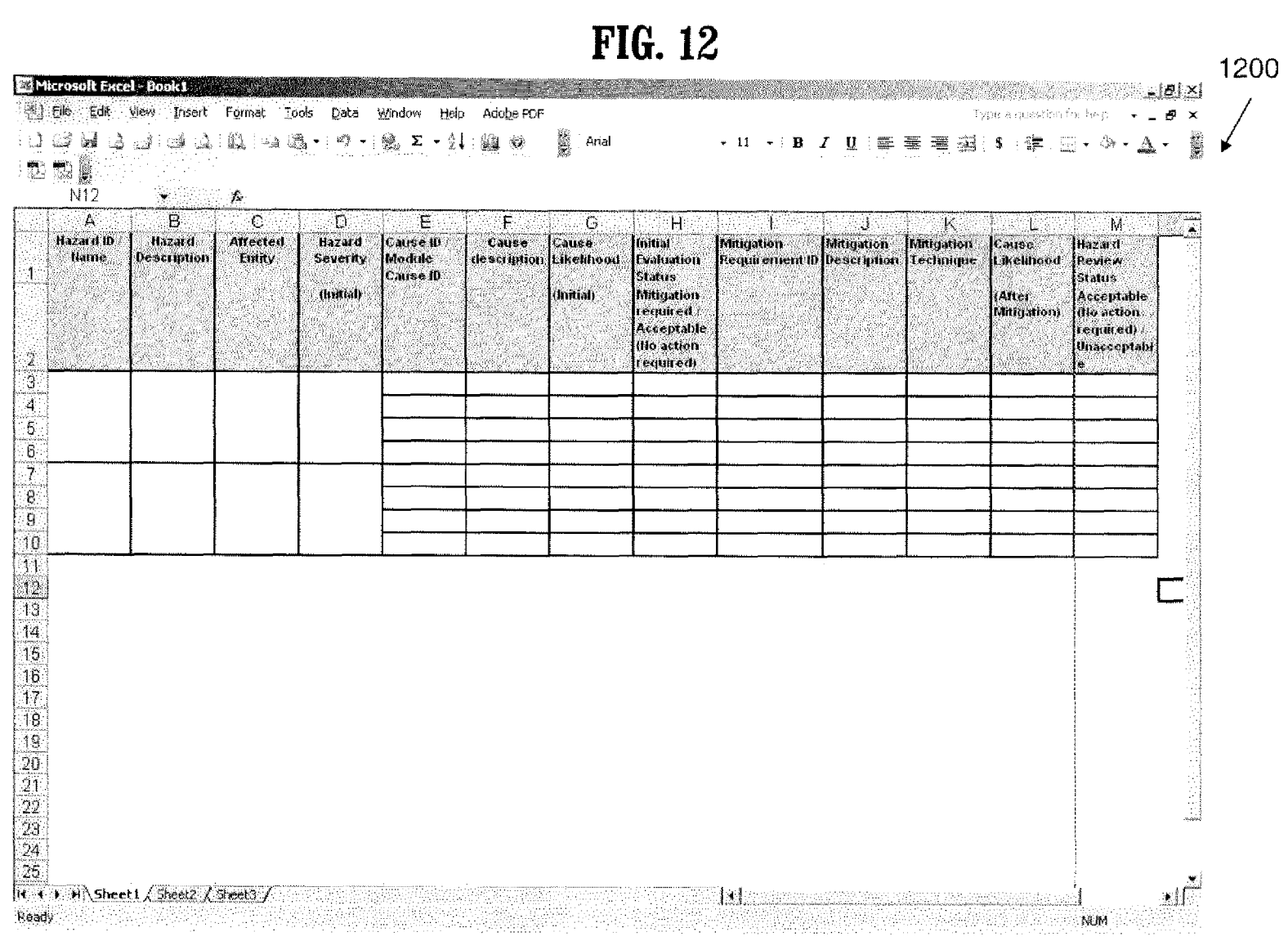

FIG. 12 illustrates a spreadsheet with hazard analysis information, according to an exemplary embodiment of the present invention. This spreadsheet displays the descriptions which are specified in the hazard-cause-mitigation tree. Each column of the spreadsheet corresponds to a field of the input dialog boxes described in connection with FIGS. 6, 7 and 8. For example, column A corresponds to the hazard identifier and column B corresponds to the hazard description, which can be entered using the Hazard dialog box 600 of FIG. 6. According to an exemplary embodiment of the present invention, the results of hazard analysis are reported into Microsoft Excel, and information exchangeability may be improved.

It is to be understood that exemplary embodiments of the present invention may be implemented in various forms of hardware, software, firmware, special purpose processors, or a combination thereof. For example, exemplary embodiments of the present invention may be implemented in software as an application program tangibly embodied on a program storage device. The application program may be uploaded to, and executed by, a machine comprising any suitable architecture.

Figure 13:
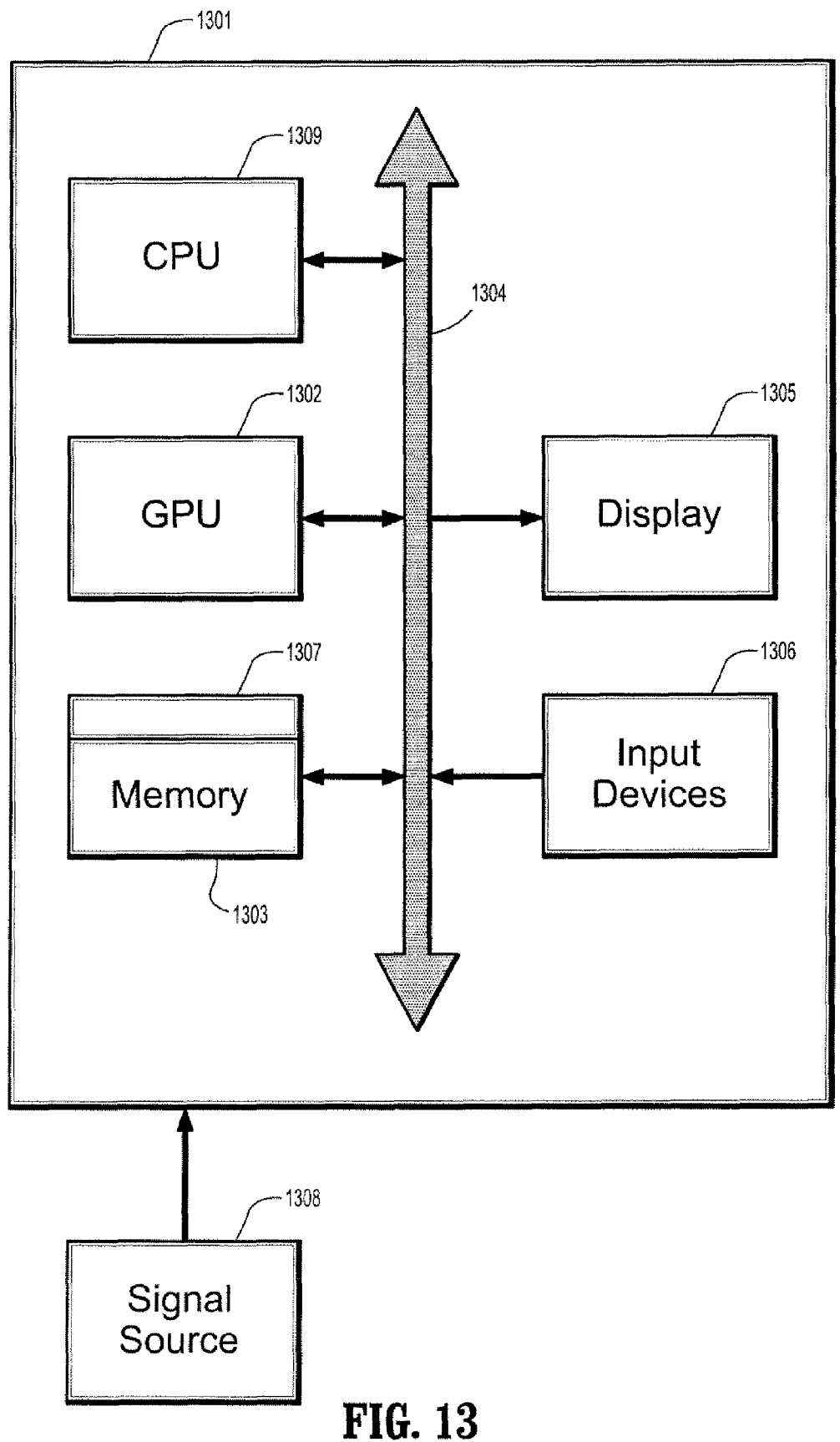
FIG. 13 illustrates a computer system for implementing hazards analysis, according to an exemplary embodiment of the present invention.

Referring to FIG. 13, according to an exemplary embodiment of the present disclosure, a computer system 1301 for implementing hazards analysis can comprise, inter alia, a central processing unit (CPU) 1309, a memory 1303 and an input/output (I/O) interface 1304. The computer system 1301 may include a graphics processing unit (GPU) 1302. The computer system 1301 is generally coupled through the I/O interface 1304 to a display 1305 and various input devices 1306 such as a mouse and keyboard. The support circuits can include circuits such as cache, power supplies, clock circuits, and a communications bus. The memory 1303 can include random access memory (RAM), read only memory (ROM), disk drive, tape drive, etc., or a combination thereof. An exemplary embodiment of the present invention can be implemented as a routine 1307 that is stored in memory 1303 and executed by the CPU 1309 to process the signal from the signal source 1308. As such, the computer system 1301 is a general purpose computer system that becomes a specific purpose computer system when executing the routine 1307 of the present invention.

The computer platform 1301 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

In an exemplary embodiment of the present invention, a system for implementing hazards analysis includes: a memory device 1303 for storing a program 1307, and a processor 1309 in communication with the memory device 1303. The processor 1309 is operative with the program 1307 to: access the memory device 1303 to obtain information specifying a system to be analyzed; build functional block diagrams using the information specifying the system to be analyzed; receive user-input hazards analysis elements; and use the functional block diagrams, the user-input hazards analysis elements and tree fault analysis for hazards analysis. The user-input hazards analysis elements may include hazards, causes and mitigations.

A system for implementing hazards analysis may include a graphical user interface that allows a user to input the hazards analysis elements. The graphical user interface may include a first dialog box that allows the user to input hazard information, a second dialog box that allows the user to input cause information, and a third dialog box that allows the user to input mitigation information.

The graphical user interface may include a first viewer for graphically displaying hazards analysis elements and relationships therebetween, a first graphical editor for building functional block diagrams using a plurality of user interface components, and a second graphical editor for tree fault analysis. The user interface components may include a display terminal, a keyboard, and/or a pointing device.

A system for implementing hazards analysis, according to an exemplary embodiment of the present invention, includes a report generator for generating reports based on results of hazards analysis. For example, the processor 1309 may be operative with the report generator to generate a spreadsheet that lists hazard information, cause information and mitigation information.

In an exemplary embodiment of the present invention, a system 1301 for providing a graphical user interface for implementing hazards analysis includes: a plurality of user interface components 1305, 1306; a memory device 1303 for storing a program 1307; and a processor 1309 in communication with the memory device 1303. The processor 1309 is operative with the program 1307 to generate a graphical user interface (GUI), wherein the GUI may includes a first viewer for graphically displaying hazards analysis elements and relationships therebetween, a first graphical editor for building functional block diagrams using the interface components, and a second graphical editor for tree fault analysis. For example, the tree fault analysis may be used to evaluate the probability of a hazards event using analytical or statistical methods. The user interface components may include a display terminal, a keyboard, and/or a pointing device.

It is to be further understood that, because some of the constituent system components and method steps depicted in the accompanying figures may be implemented in software, the actual connections between the system components (or the process steps) may differ depending upon the manner in which the present invention is programmed. Given the teachings of exemplary embodiments of the present invention provided herein, one of ordinary skill in the related art will be able to contemplate these and similar implementations or configurations of the present invention.

Figure 14:
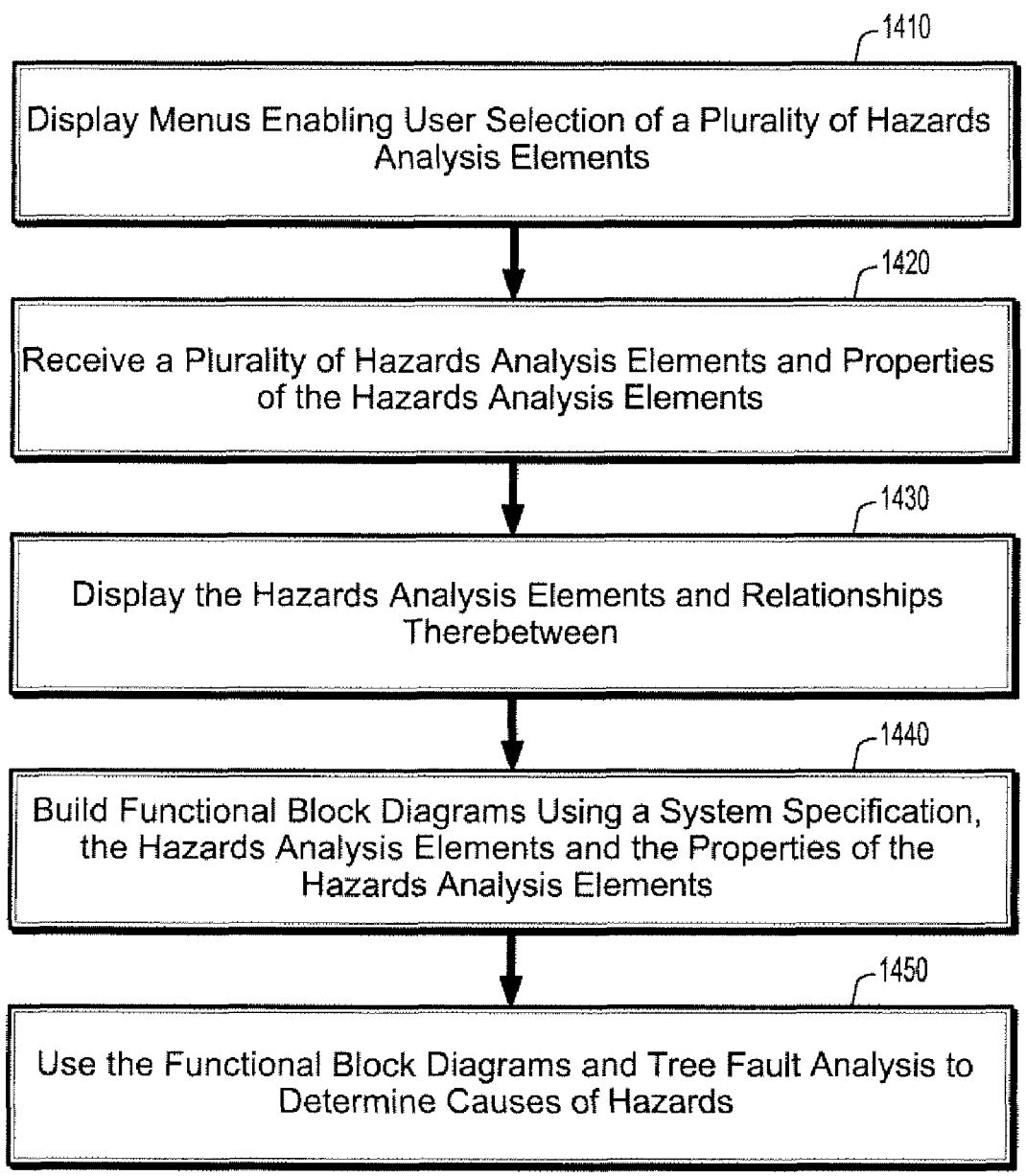
FIG. 14 is a flowchart showing a computer-implemented method of hazards analysis, according to an exemplary embodiment of the present invention.

FIG. 14 is a flowchart showing a computer-implemented method of hazards analysis, according to an exemplary embodiment of the present invention. Referring to FIG. 14, in step 1410, display menus enabling user selection of a plurality of hazards analysis elements. The menus, which may be associated with the dialog boxes, may be changed by user input to adapt to a particular domain. The hazards analysis elements may include hazards, causes and mitigations.

In step 1420, receive a plurality of hazards analysis elements and properties of the hazards analysis elements. Input dialog boxes may be provided to allow a user to input information regarding hazards, causes and mitigations. For example, input dialog boxes according to exemplary embodiment of the present invention described in connection with FIGS. 6, 7 and 8 may be employed.

In step 1430, display the hazards analysis elements and relationships therebetween. This may include displaying a hazards-causes-mitigations tree. For example, information entered into the dialog boxes may be displayed by the hazard-cause-mitigation tree and/or the properties panel 440 shown in FIG. 4.

In step 1440, build functional block diagrams using a system specification, the hazards analysis elements and the properties of the hazards analysis. For example, the Functional Block Diagram view shown in FIG. 8 depicts a functional block diagram representation of an example system on which hazard analysis is to be performed.

In step 1450, use the functional block diagrams and tree fault analysis to determine causes of the hazards elements. For example, the tree fault analysis may be used to evaluate the probability of a hazards event using analytical or statistical methods.

Although exemplary embodiments of the present invention have been described in detail with reference to the accompanying drawings for the purpose of illustrations it is to be understood that the inventive processes and systems are not to be construed as limited thereby. It will be readily apparent to one of ordinary skill in the art that various modifications to the foregoing exemplary embodiments can be made without departing from the scope of the invention as defined by the appended claims, with equivalents of the claims to be included therein.

What is claimed is:

1. A computer-implemented method of hazards analysis, comprising:
   displaying menus enabling user selection of a plurality of hazards analysis elements;
   receiving a plurality of hazards analysis elements and properties of the hazards analysis elements;
   displaying the hazards analysis elements and relationships therebetween using a hazard-cause-mitigation tree;
   building a functional block diagram representation of a system on which hazard analysis is to be performed using a Unified Modeling Language system specification, the hazards analysis elements and the properties of the hazards analysis elements;
   using the functional block diagrams, the hazard-cause-mitigation tree, and fault tree analysis to determine causes of hazards.

2. The computer-implemented method of claim 1, wherein the hazards analysis elements comprise hazards, causes and mitigations.

3. The computer-implemented method of claim 1, wherein fault tree analysis is used to evaluate the probability of a hazards event using analytical or statistical methods.

4. A system comprising a program storage device readable by a computer, tangibly embodying a non-transitory program of instructions executable by the computer to perform the method steps for performing a hazards analysis, the method comprising the steps of:
   providing a Unified Modeling Language (UML) specification of a system to be analyzed for hazards, said UML specification including a hazard link for providing hazard analysis;

building functional block diagrams using the UML specification of the system to be analyzed;

receiving user-input hazards analysis elements and building a hazard-cause-mitigation tree from the hazards analysis elements; and using the functional block diagrams, the hazard-cause-mitigation tree and fault tree analysis for hazards analysis.

5. The system of claim 4, wherein the user-input hazards analysis elements comprise hazards, causes and mitigations.

6. The system of claim 4, wherein the method further comprises generating a graphical user interface that allows a user to input the hazards analysis elements.

7. The system of claim 6, wherein the graphical user interface includes
- a first dialog box that allows the user to input hazard information,
- a second dialog box that allows the user to input cause information, and
- a third dialog box that allows the user to input mitigation information.

8. The system of claim 6, wherein the graphical user interface comprises a first viewer for graphically displaying hazards analysis elements and relationships therebetween.

9. The system of claim 8, wherein the graphical user interface further comprises a first graphical editor for building functional block diagrams using a plurality of user interface components.

10. The system of claim 8, wherein the graphical user interface further comprises a second graphical editor for building a fault tree for use in fault tree analysis.

11. The system of claim 8, wherein the graphical user interface further comprises a third graphical editor for editing Unified Modeling Language (UML) use case diagrams for the inclusion of hazards to link hazards to system requirements.

12. The system of claim 9, wherein the user interface components comprise at least one of a display terminal, a keyboard, or a pointing device.

13. The system of claim 4, wherein the method further comprises generating reports based on results of hazards analysis.

14. The system of claim 13, wherein the reports include a spreadsheet that lists hazard information, cause information and mitigation information.

15. A system comprising a program storage device readable by a computer, tangibly embodying a program of instructions executable by the computer to implement a system for providing a graphical user interface for implementing hazards analysis, the graphical user interface comprising:
- a plurality of user interface components for entering hazards analysis elements;
- a first viewer for graphically displaying hazards analysis elements and relationships therebetween;
- a first graphical editor for building functional block diagrams using the interface components;
- a second graphical editor for building a fault tree for use in fault tree analysis; and
- a third graphical editor for editing Unified Modeling Language (UML) use case diagrams for the inclusion of hazards to link hazards to system requirements.

16. The system of claim 15, wherein the user interface components comprise at least one of a display terminal, a keyboard, or a pointing device.

17. The system of claim 15, wherein the hazards analysis elements comprise hazards, causes and mitigations.

18. The system of claim 15, wherein fault analysis is used to evaluate the probability of a hazards event using analytical or statistical methods.

19. The system of claim 15, further comprising a report generator for generating reports based on results of hazards analysis.

20. The system of claim 19, wherein the report generator generates a spreadsheet that lists hazard information, cause information and mitigation information.

* * * * *